July 28, 1959 E. H. GATZERT 2,897,284

TRUNK SWITCHING CIRCUIT

Filed Nov. 4, 1955 3 Sheets-Sheet 1

INVENTOR.
ERNEST H. GATZERT

BY J. Warren Whitesel

ATTORNEY

July 28, 1959 E. H. GATZERT 2,897,284

TRUNK SWITCHING CIRCUIT

Filed Nov. 4, 1955 3 Sheets-Sheet 2

July 28, 1959 E. H. GATZERT 2,897,284

TRUNK SWITCHING CIRCUIT

Filed Nov. 4, 1955 3 Sheets-Sheet 3

2,897,284

TRUNK SWITCHING CIRCUIT

Ernest H. Gatzert, Rochester, N.Y., assignor to General Dynamics Corporation, a corporation of Delaware Application November 4, 1955, Serial No. 544,895

12 Claims. (Cl. 179—27)

This invention relates to telephone switching circuits, and more particularly to switching circuits for selecting between a plurality of lines on a preference basis.

Briefly, intercepted call service is given when a subscriber moves or for some other reason wants the telephone company to answer calls that are directed to his station. Usually, all intercept calls are directed to an operator's position over a special trunk line or lines. This is an expensive procedure since the intercept trunk is idle a large part of the time; hence, maximum service from the equipment is impossible. On the other hand, if regular trunk lines are used for extending intercept calls, it is difficult for the operators to organize their time and service because they never know before they answer a call whether it is going to be an intercept or a regular call. If the intercept calls were to be extended over a trunk which is the last in preference for regular calls and the first in preference for intercept calls, there would be a balance by which the vast majority of intercept calls could be recognized by the operator before she answers. Still, the trunk line would be available for regular calls during peak load conditions. Furthermore, intercept calls would tend to be extended to the same operator.

A first object of this invention is to provide a new and improved trunk switching circuit.

A second object of this invention is to provide means for extending calls to any one of a plurality of lines on a preference basis.

Another object of this invention is to extend intercepted calls over any one of a plurlity of lines on a preference basis.

Still another object of this invention is to extend intercepted calls over a regular switch train and any of a plurality of trunk lines on a preferred basis to a regular operator position.

It is thought that the means for accomplishing these and other objects will be understood best by making reference to the attached drawings, in which:

Fig. 1A shows a telephone system by block diagram;

Figs. 1–3, when properly joined, show an intercept trunk switching system; and,

Fig. 4 shows the manner in which the remaining figures should be joined.

The drawings show the source of office potential as simple plus (+) and minus (−) signs. As in the case in most telephone systems, the plus or positive terminal is described as being connected to ground. For this reason, the terms "(−) battery" and "ground (+)" are used hereinafter. It should be understood that this or any other power source could be used. The heavily inked lines used to show trunk switching circuit 30 in Fig. 1A indicates that this is the box which is shown in detail in the remaining drawings.

*Brief description*

The subscriber at station A initiates a call which may be completed in any suitable manner over automatic switch train 10. Switch train 10 may be any well known automatic switching equipment. This call may be extended to various destinations, depending upon the particular digit numbers that were dialed by the calling subscriber. For example, the call may be extended to a distant office 11, to a local subscriber B, or to an operator position 12. However, the calling subscriber also may dial a series of digits that direct the switch train to seize a line which once served a subscriber who has been disconnected therefrom or for some other reason needs intercept service. In this case, means must be provided to intercept the call and to inform the calling subscriber of the fact that he cannot complete the call.

In some exchanges there may be a special intercept operator who does nothing but give service to calls of this type. However, in other exchanges these intercepted calls may be extended to a regular operator or to a preferred operator. Fig. 1A is useful for explaining this feature. For example, subscriber A may extend a call over switch train 10, one of the trunk lines leading to CLR trunk circuits 40 and then to toll operator position 50. Only one toll position 50 is shown; however, it is obvious that trunk circuits 40 also could be connected to two or more toll positions. Normally, calls from subscriber A to toll board 50 will be extended over the lines 31, 32 and 33 in that order of preference. That is, if all lines are idle, line 31 is used. If line 31 is busy, line 32 is used, etc. Intercept calls are directed through line circuit 15, trunk circuit 20 and trunk switching circuit 30. Circuit 30 has access to the same trunk lines 31–33, and CLR trunk circuits 40 to toll board 50. This time, however, the preference is different. For purposes of illustration only, I have shown the preference as 33, 32 and 31. Hence, it is seen that usually regular calls are extended to operator 50 over trunk circuit 31, while intercept calls are extended over trunk line 33.

A splash of ring-back tone is transmitted to the intercept operator when she answers to inform her of the fact that she has intercepted a call.

*Detailed description*

Figures 1, 1A:
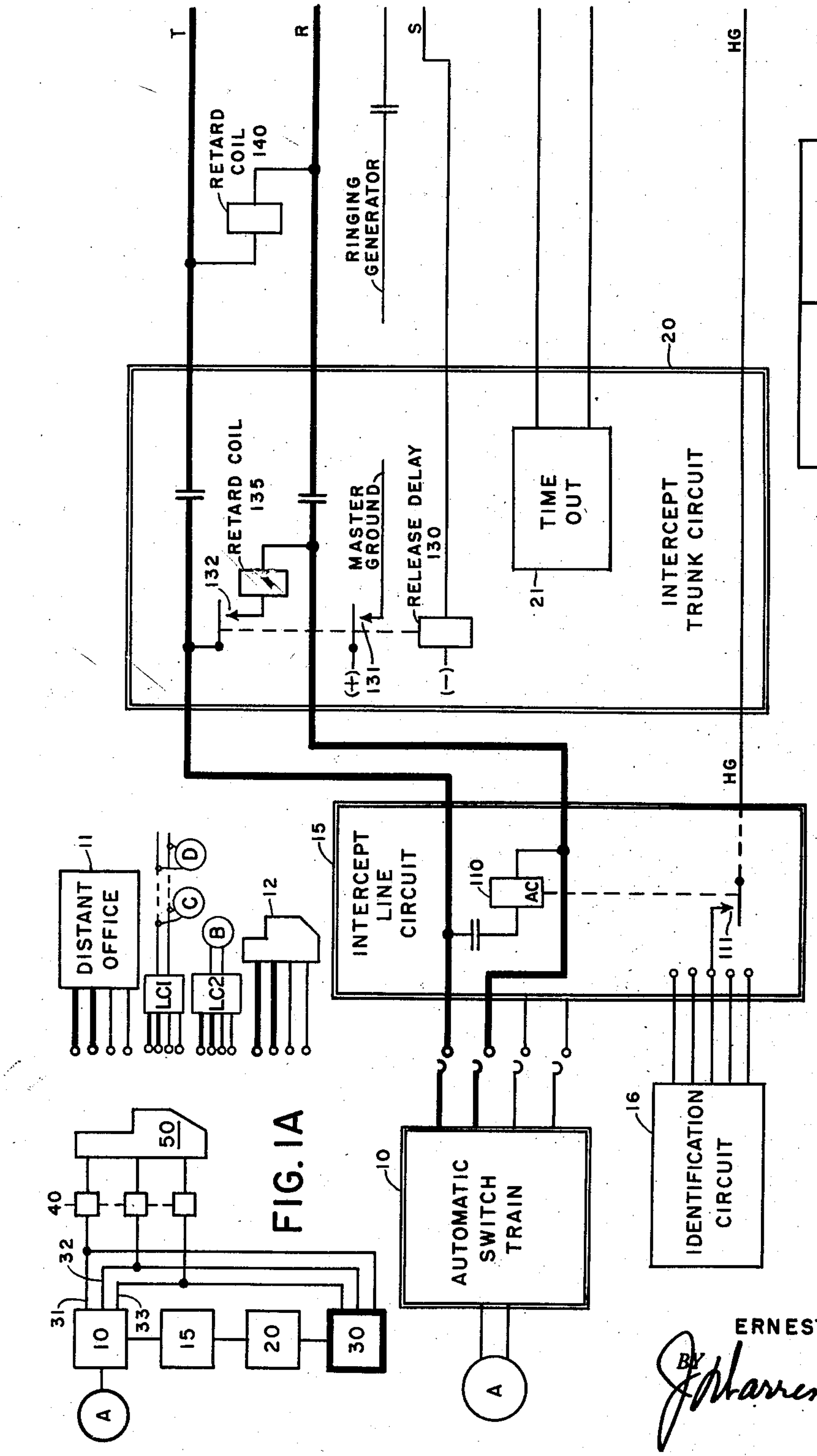
Figure 4:
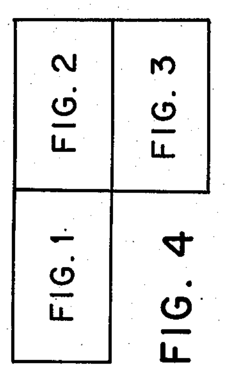
Figure 2:
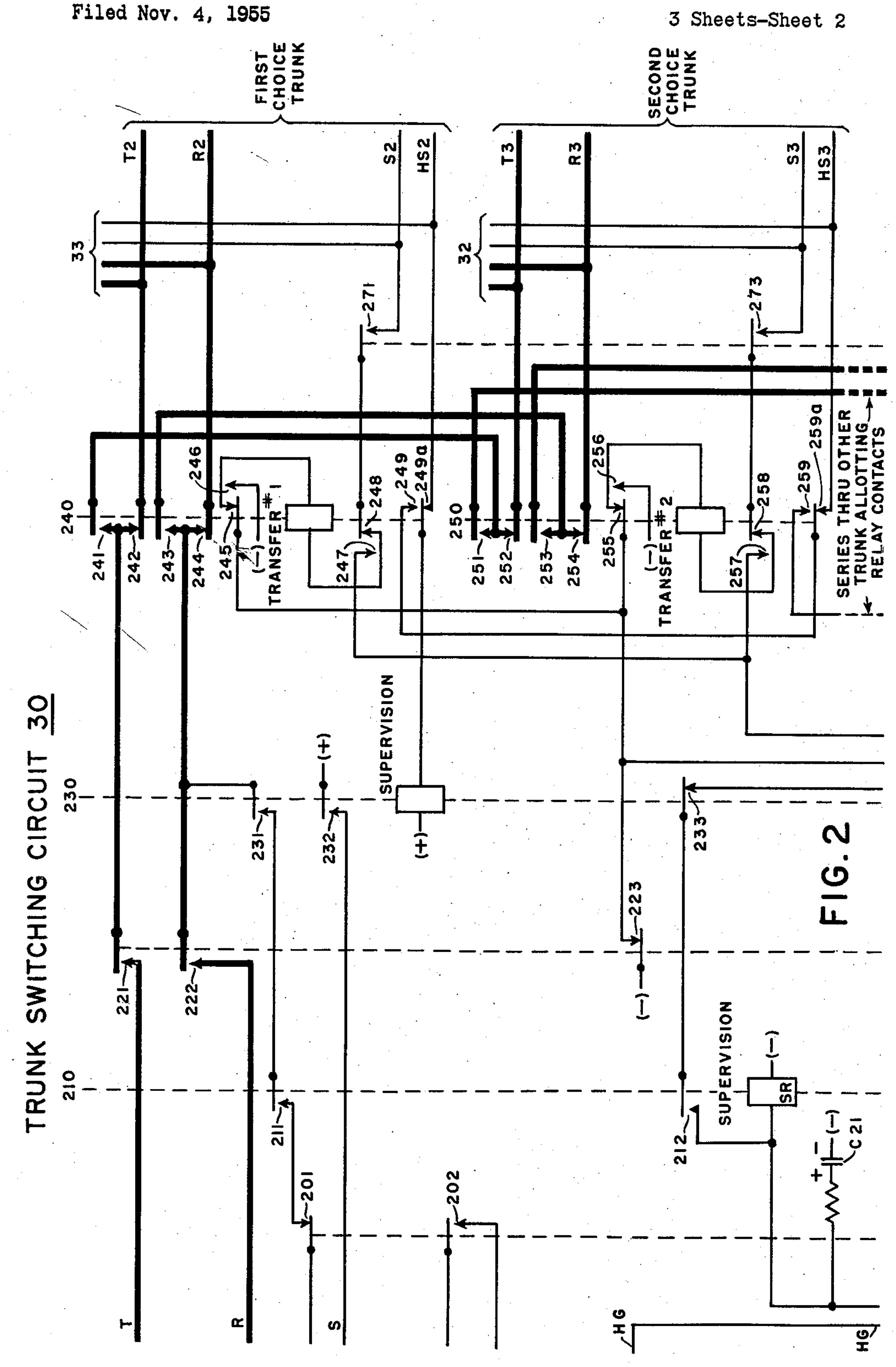
Figure 3:
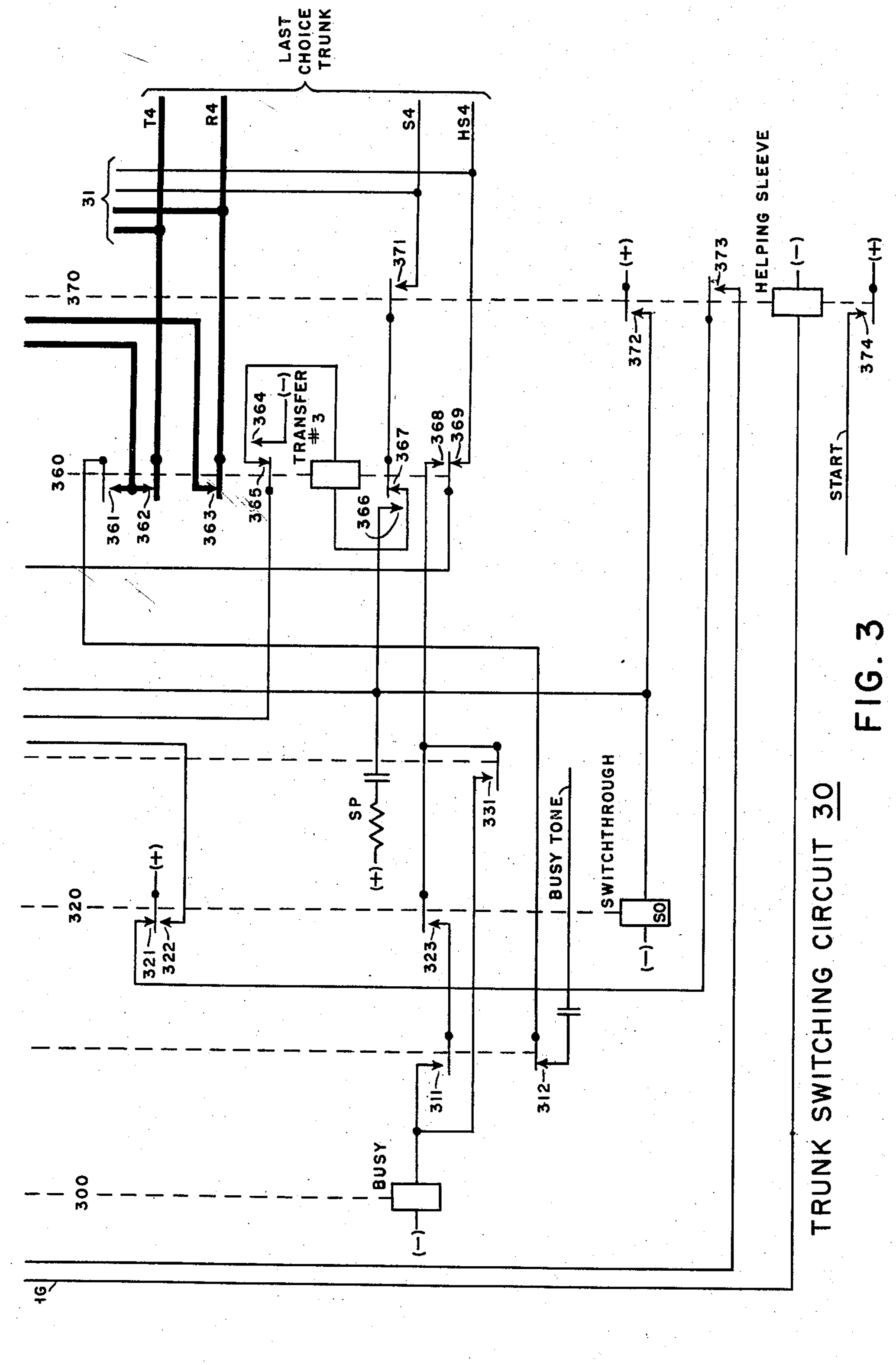

In greater detail, subscriber A operates automatic switch train 10 in a conventional manner (not detailed) to seize intercept line circuit 15. Ringing current is projected by the automatic switch train in any well known manner. Any suitable alternating current relay may be connected in the line circuit so that it will respond to ringing current. By way of example only, relay 110 is shown as connected across the tip and ring sides of the line. Relay 110 responds to the ringing current. It closes its contacts 111, thus connecting conductor HG to a suitable identifying circuit, 16.

More specifically, if a call is directed to a private line subscriber, there is no problem of identifying a called party. Either the call is to be intercepted or it is not to be intercepted. However, if a call is directed to a party line, there is a problem. For example, if it is assumed that subscriber D discontinues telephone service, it becomes necessary to test each call extended through line circuit LC1 to determine whether the call may be completed to called subscriber C or whether the call must be intercepted because it is for subscriber D who is no longer accessible via line circuit LC1. Therefore, contacts 111 are provided to utilize an identification circuit 16, which may take any well known form. For example, it might be wirings strapped to a bank of the minor switch which is used to select a proper signaling current. Or, the identifying circuit could be frequency responsive relays which are adapted to identify the frequency of ringing current. Any other suitable identification circuit may be used. However, when contacts 111 operate, a circuit is completed from ground (not shown)

in identification circuit 16 to operate helping sleeve relay 370 over an obvious circuit.

Relay 370 operates and closes contacts 374 to start common equipment. This common equipment supplies ringing current, busy tone, and any other signaling currents which may be required. Contacts 373 close to extend ground to operate supervision relay 210. This circuit may be traced from ground (+) at contacts 321, through contacts 373 and the winding of relay 210 to (−) battery. Contacts 372 close to energize slow operate switchthrough relay 320. Some time will elapse before this relay operates its contacts. Contacts 371, 273 and 271 close to test the various trunks for a busy condition.

Assuming that the first choice trunk is busy, on a regular call which is extended from switch train 10 over line 33, a busy ground marking is applied to sleeve conductor S2 by equipment in one of the CLR trunk circuits 40 which is shown in Fig. 1A. Ground (+) is extended through contacts 271, 248, the winding of a first transfer relay 240, contacts 245 and 223 to (−) battery. During the brief interval before relay 320 opens contacts 223, there is time for transfer relay 240 to operate and lock from (−) battery at its upper contacts 246 over a circuit through its winding, contacts 247 and 372 to ground (+); thereby extending its own locking circuit through a parallel locking circuit. By parallel locking circuit I mean that circuit which may be traced from (−) battery on contacts 246, 256 and 364, through the winding of each of the transfer relays, contacts 247, 257 and 366 to ground (+) on contacts 372. The effect of operation of relay 240 is to close contacts 241 and 243 while opening contacts 242 and 244 thereby switching the talking conductors from the first choice trunk to the second choice trunk. If that trunk is also busy, a circuit is completed from the CLR trunk circuit over conductor S3, through contacts 273 and 258 for operating the second transfer relay 250 in a manner similar to that already described in the case of relay 240. It, too, would then extend its own locking circuit over the parallel locking circuit.

However, assuming that the second choice trunk is then idle, transfer relay 250 does not operate. The talking conductors will be connected from conductors T and R to conductors T3 and R3, respectively. In a similar manner, contacts on each of the transfer relays forms a chain for transferring the talking conductors to an idle trunk circuit.

After a brief interval of time determined by its slow operate characteristics, switchthrough relay 320 operates and closes contacts 221 and 222 thereby completing a loop to the intercept operator. This loop may be traced from conductor T3 through rest contacts 252, operated contacts 241, 221, conductor T, the winding of retard coil 140, conductor R, contacts 222, 243, 254 and conductor R3. Conductors 32 extend back to switch train 10 in the manner shown in Fig. 1A. Any suitable equipment (not shown) may function to signal the intercept operator responsive to the completion of this loop. Contacts 223 open to break the original energizing circuit for transfer relay 240. However, relay 240 has already locked in an operated condition at its contacts 246. When the circuit that was called (in this case, the second choice trunk) returns a busy ground marking over conductor S3, relay 250 will not operate because contacts 223 are now open.

It might be recalled that supervisory relay 210 operated during the brief interval after switchthrough relay 320 was energized but before it operated. This circuit included contacts 321, 373, and the winding of relay 210 to (−) battery. Capacitor C21 was charged during this same brief interval also over the circuit from ground (+) through contacts 321, 373 and capacitor C21 to (−) battery. When contacts 321 are opened there is a discharge current through capacitor C21 which holds supervision relay 210 operated. As soon as contacts 322 close, a circuit is completed from ground (+) through contacts 322, 233, 212 and the winding of relay 210 to hold it operated. This same circuit is also completed through capacitor C21 to charge it once more.

When supervision relay 210 operates, it closes contacts 211 to prepare a ring-back tone circuit. Contacts 212 are part of a locking circuit for relay 210, which have been explained already. Contacts 311 close and 312 open; however, they have no function since there is an idle trunk and, therefore, contacts 368 and 361 are now open.

After the operator responds to the signal that was sent when the loop including retard coil 140 was closed, a suitable (−) battery marking is placed on conductor HS3. This marking is extended through contacts 259*a*, operated contacts 249, and the winding of supervision relay 230 to ground (+). It might be noted that the circuit for relay 230 includes a chain of contacts on the various transfer relays. Relay 230 operates. Contacts 331 have no function since there is no all-busy condition and contacts 368 are open. Contacts 232 close to extend a ground (+) marking to operate release delay relay 130 in intercept trunk circuit 20. This relay closes its contacts 131 thereby extending a master ground (+) marking to hold intercept trunk circuit 20 and any other suitable equipment. Contacts 132 connect retard coil 135 across the talking conductors, thus tripping the ringing current that is extended from automatic switch train 10 and completing a circuit for talking battery. Contacts 231 close to extend ring-back tone to the operator. The circuit for this tone may be traced from the ringing generator conductor through contacts 201, 211, 231, operated contacts 243 and rest contacts 254 to ring conductor R3. The operator hears this ring-back tone and knows that she has answered an intercepted call. When contacts 233 open, the locking circuit for supervision relay 210 is broken. However, relay 210 does not release immediately; instead, there is a discharging current extended through capacitors C21 and the winding of relay 210 to (−) battery. This discharging current holds supervision relay 210 in an operated condition for a given interval of time. During this time interval, ring-back tone is connected to be heard by the operator, as explained above. After expiration of this time interval, capacitor C21 is fully discharged and contacts 211 open to terminate the transmission of ring-back tone.

*Release*

After the operator has given complete service to the call, she disconnects and the (−) battery marking is removed from conductor HS3. Responsive thereto, supervision relay 230 restores. Contacts 232 open, thus restoring release delay relay 130 which is in the intercept trunk circuit. Contacts 131 open to remove master ground thus releasing any equipment which was locked in an operated condition depending upon the maintenance of this ground. Either at this time or later when the calling subscriber hangs up, depending upon the manner in which circuits 15 and 20 are arranged to operate, ground (+) is removed from conductor HG thus restoring helping sleeve relay 370. Master ground is removed at contacts 372 and the circuit is returned to normal.

*All trunks busy*

Next, let it be assumed that all trunks were busy when the intercepted call was received. Relay 370 operates responsive to the ground applied at contacts 111 in intercept line circuit 15 to conductor HG. Contacts 271, 273 and 371 close. Since it is assumed that there is an all trunks busy condition, a busy ground marking is applied to conductors S2, S3 and S4. Each of the transfer relays, 240, 250 and 360, operates and locks through its own locking contacts before slow operate switchthrough relay 320 actuates its contacts. Supervision relay 210 is operated when contacts 373 close. Therefore, a circuit is now completed for operating busy relay 300 and supervision relay 230. This circuit may be traced from (—) battery through the winding of relay 300, operated contacts 311, 323, 368, 259 and 249 to ground (+) extended through the winding of supervision relay 230. Relay 230 closes contacts 232 to operate release delay relay 130 which in turn trips ringing current by closing contacts 132. Contacts 331 close to hold busy relay 300 in an operated condition. Contacts 201 open to break the circuit from the ringing generator to prevent the transmission of ring-back tone to the operator.

Contacts 233 open to restore supervision relay 210. When it restores after a brief interval of time determined by the discharge time of capacitor C21, contacts 311 open; however, busy relay 300 has already been locked at contacts 331. Contacts 312 close and busy tone is extended from the busy tone conductor through contacts 312, 361, 251, 241, 221 and conductor T to the calling subscriber.

Meanwhile, contacts 202 closed when busy relay 300 originally operated. This completes a circuit to timeout device 21. It operates in any suitable manner to cause the call to be forcibly disconnected in the event that the calling subscriber does not hang up right away.

While I have shown and described a single modification of my invention, it should be obvious that various changes may be made without departing from the spirit of the invention. Therefore, it is my intention to cover within the claims not only the particular embodiment shown, but also all other circuits which may fall within the true spirit of my invention.

What is claimed is:

1. In a telephone system, a plurality of subscriber lines at least one of which is given call intercept service, a plurality of trunk lines, automatic switch means for extending calls between said subscriber lines and over said trunk lines, said switch means having access to said trunk lines on a particular preference basis, trunk switching means for selecting between said trunk lines in another order of preference, an intercept line circuit, means responsive to a call extended over said automatic switch means directed to said one of said lines that is given intercept service for connecting said automatic switch means to said trunk switching means via said line circuit, and means responsive to said last named means for causing said trunk switching means to select between said trunks in said other order of preference.

2. The telephone system of claim 1 wherein said one line that is given intercept service is a party line, and there is provided means in said automatic switch means for transmitting ringing current over said party line, means associated with said intercept line circuit for identifying the particular ringing current that is being transmitted, and means whereby said means for connecting said automatic switch means to said trunk switching means is made responsive to said identifying means.

3. The telephone system of claim 1 together with means responsive to answer of said call extended through said trunk switching means and over said trunk for causing said trunk switching means for transmitting ring-back tone over said trunk thereby identifying said call as an intercepted call, and means for automatically terminating said transmission of said ring-back tone after a predetermined interval of time.

4. The telephone system of claim 2 including a relay controlled responsive to answer supervision, contacts on said relay, means including said contacts for transmitting ring-back tone responsive to answer supervision, capacitor means connected to hold said relay operated for a particular period of time depending upon the charge which is stored upon said capacitor, and means responsive to answer supervision for discharging said capacitor through said relay to release said relay after said particular period of time, thus breaking said circuit from ring-back tone and thereby terminating said transmission of ring-back tone over said trunk.

5. A telephone system comprising an intercept line circuit, an alternating-current-responsive relay in said line circuit connected to respond to ringing current, means for identifying the ringing current which signals the presence of a call for a subscriber being given intercept service, a plurality of trunks, switching means for providing a distribution of said trunks on a preference basis, means for extending said call from said line circuit to said switching means, means in said switching circuit for assigning said trunks on a preference basis, and means for causing said switching means to assign the first idle one of said trunks in its order of preference when preceding trunks in the order of preference are busy.

6. The telephone system of claim 5, and means responsive to completion of said call over said assigned trunk for transmitting a timed period of ringing current over said assigned trunk thus signaling the presence of an intercepted call.

7. The telephone system of claim 5 wherein said means for assigning said trunks comprise a plurality of relays, there being one relay individual to each of said trunks, and there is provided means responsive to the presence of an intercept call for operating the relay individual to each busy trunk, and means responsive to operation of each of said relays for switching said connection from said line circuit to the next trunk in its order of preference.

8. The telephone system of claim 7 wherein each trunk comprises two talking and two control conductors, together with means effective over one of said control conductors associated with each trunk for operating said relays associated with busy ones of said trunks, a supervision relay, means effective over the other of said control conductors for operating said supervision relay responsive to answer supervision, means responsive to operation of said supervision relay for initiating the transmission of ringing tone over said trunk, means also responsive to operation of said supervision relay for measuring a predetermined interval of time, and means responsive to the expiration of said interval of time for terminating said ringing tone applied to said trunk circuit to signal said intercept call.

9. The telephone system of claim 7 wherein each trunk comprises two talking and two control conductors, together with means associated with each trunk and effective over one of said control conductors for operating those of said relays which are associated with busy ones of said trunks, said means for switching said connection comprising means including contacts on the one of said relays that is individual to the first trunk in said preference order for normally preparing to conect said line circuit to said first trunk, and means effective when said contacts are operated for preparing to connect said line circuit to the second of said trunks, there being similar means to prepare the connection for said line circuit associated with each trunk.

10. A telephone system comprising an intercept line circuit, means in said line circuit for detecting calls to subscribers who are to be given call intercept service, a plurality of trunks each comprising two talking and two control conductors, means for distributing said trunks on a preference basis, means responsive to said detection of an intercept call for extending said call from said line circuit to said distributing means, said means for distributing calls comprising a plurality of relays, there being one relay individual to each of said trunks, means responsive to selection of a busy trunk and effective over one of the control conductors that is individual to each of said busy trunk for operating the relay that is individual to said busy trunk, and means responsive to the operation of each of said relays for extending its own locking circuit though a parallel locking circuit and for disconnecting said one control conductor from the associated relay.

11. The telephone system of claim 10 and a supervision relay, a chain circuit of contacts on each of said plurality of relays arranged in said order of preference, means for connecting the other of said control conductors associated with said first trunk through said chain circuit to said supervision relay, and means for operating said supervision relay over said other control conductor and chain of contacts responsive to answer supervision.

12. The telephone system of claim 11 and a second and third chain of contacts on each of said plurality of relays arranged in said order of preference, a pair of talking conductors extending from said intercept line circuit to said distributing means, and means for connecting said talking conductors over said second and third chain of contacts whereby said pair of talking conductors is connected with said first idle trunk.

References Cited in the file of this patent

UNITED STATES PATENTS

| | | |
|---|---|---|
| 2,574,903 | Bellamy | Nov. 13, 1951 |
| 2,605,362 | Kessler | July 29, 1952 |
| 2,678,355 | Pharis | May 11, 1954 |
| 2,764,636 | Gray | Sept. 25, 1956 |